J. H. Dickerson,
Portable Forge,
Nº 45,911.
Patented Jan. 17, 1865.
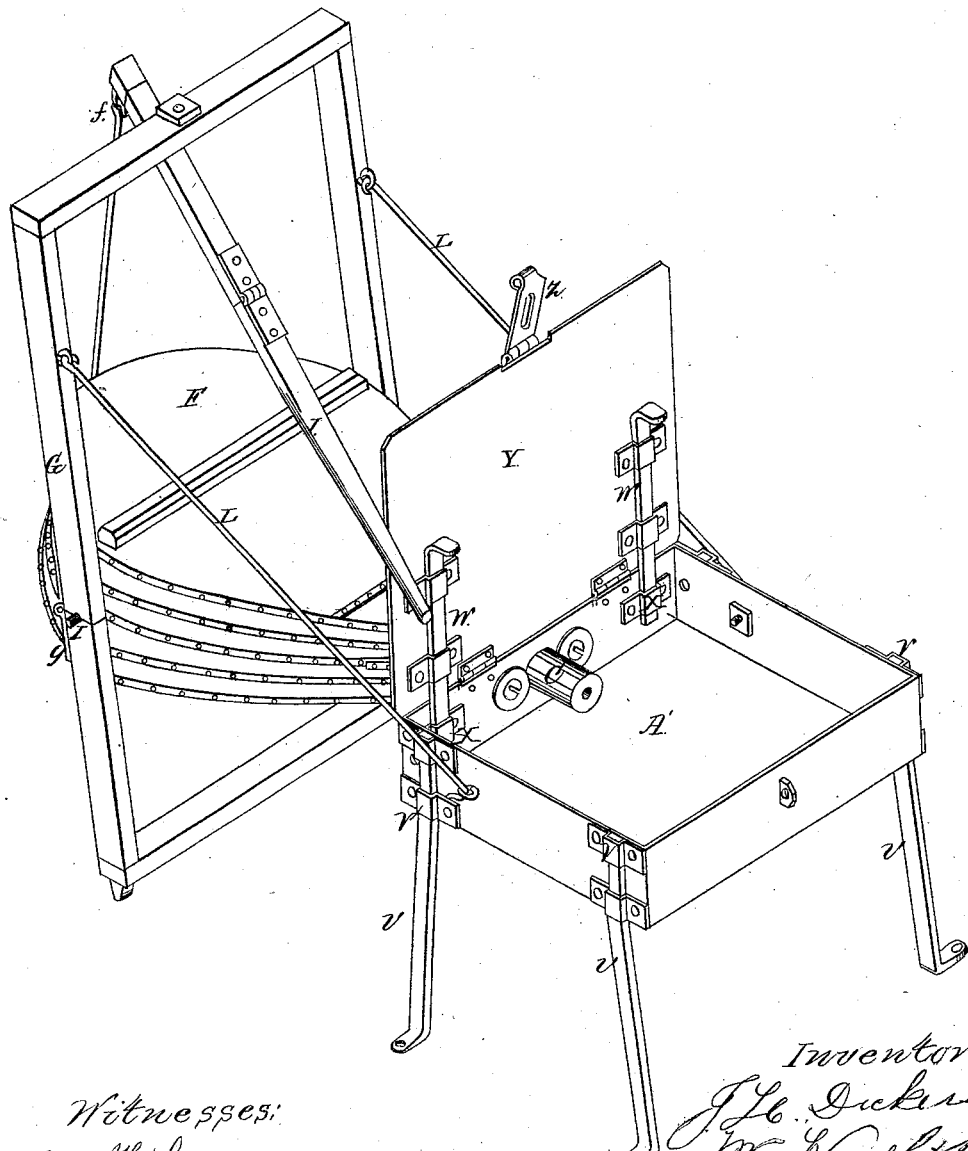
Witnesses:
James H. Layman,
C. H. Ashton.
Inventor;
J. H. Dickerson
Mr. Knight & Bro
Attys.

UNITED STATES PATENT OFFICE.

JOHN H. DICKERSON, OF CINCINNATI, OHIO.

IMPROVED PORTABLE FORGE.

Specification forming part of Letters Patent No. 45,911, dated January 17, 1865.

*To all whom it may concern:*

Be it known that I, JOHN H. DICKERSON, of Cincinnati, Hamilton county, Ohio, have invented a new and useful Portable Forge, for the use of Blacksmiths, Farriers, &c.; and I do hereby declare the following to be a full, clear, and exact description thereof, reference being had to the accompanying drawing, making part of this specification and representing in perspective my forge set up for use.

My invention consists, essentially, of, first, a forge-bed adapted to serve as a tool-box while traveling; second, a screen or windboard employed as a cover for the said toolbox; third, a frame and lever for supporting and operating the bellows, adapted to be compactly folded for transportation.

The whole constitutes a portable forge which can be repaired with materials available in the field, and which is capable of producing an intensity of heat equal to a large permanent forge, whereby it is enabled to do all the heavy work usually required by an army in the field—such, for example, as welding the axles and tires of army-wagons, &c.

My forge may be unpacked and set up ready for use in the space of one minute, and packed ready for transportation in the same time.

A' is a rectangular box, which may be partially filled with ashes, earth, or sand for the fire-bed, and which also serves as a receptacle for the tools when the forge is to be moved. The rear side of the box A' has an opening, $b$, in it, through which the tuyere C of the bellows F is inserted.

G is a stand made in two sections, joined by a hinge, $g$. The gudgeons I of the bellows F rest in bearings provided in the joint of said stand.

J is a jointed lever suspended at $j$ to the upper part of the stand G, and linked or engaged to the lower cheek of the bellows F.

L L are hooks which connect the stand G with the box A'.

U are legs entering staples V.

W are removable cleats, which, being inserted in the staples X, act to hold the lid Y up, so as to make it serve the purpose of a screen or wind-board.

Z is a catch to secure the cover Y down upon the pan A' when the latter is used as a tool-chest in traveling.

Having thus described my invention, the following is what I claim as new therein and desire to secure by Letters Patent:

1. The combination of the pan A', hinged plate Y, bolts W W, and catch X, constructed and employed, as herein specified, to constitute a forge-bed and screen while in use and a close and secure tool box in traveling.

2. The hinged frame G and brace-rods L L, employed to support the bellows while in use and adapted to be compactly folded for transportation.

3. The combination of the pan A', screen Y, bellows F C, stand G, lever J, and braces L, all constructed and arranged substantially as and for the purposes set forth.

In testimony of which invention I hereunto set my hand.

JNO. H. DICKERSON.

Witnesses:
GEO. H. KNIGHT,
JAMES H. LAYMAN.